(12) United States Patent
Song et al.

(10) Patent No.: US 11,804,074 B2
(45) Date of Patent: Oct. 31, 2023

(54) METHOD FOR RECOGNIZING FACIAL EXPRESSIONS BASED ON ADVERSARIAL ELIMINATION

(71) Applicants: Chongqing University, Chongqing (CN); University of Electronic Science and Technology of China, Chengdu (CN); Dibi (Chongqing) Intelligent Technology Research Institute Co., Ltd., Chongqing (CN); Star Institute of Intelligent Systems, Chongqing (CN)

(72) Inventors: Yongduan Song, Chongqing (CN); Feng Yang, Chongqing (CN); Rui Li, Chongqing (CN); Yiwen Zhang, Chongqing (CN); Haoyuan Zhong, Chongqing (CN); Jian Zhang, Chongqing (CN); Shengtao Pan, Chongqing (CN); Siyu Li, Chongqing (CN); Zhengtao Yu, Chongqing (CN)

(73) Assignees: Chongqing University, Chongqing (CN); University of Electronic Science and Technology of China, Chengdu (CN); Dibi (Chongqing) Intelligent Technology Research Institute Co., Ltd., Chongqing (CN); Star Institute of Intelligent Systems, Chongqing (CN)

(*) Notice: Subject to any disclaimer, the term of this patent is extended or adjusted under 35 U.S.C. 154(b) by 283 days.

(21) Appl. No.: 17/448,926

(22) Filed: Sep. 27, 2021

(65) Prior Publication Data
US 2022/0327308 A1    Oct. 13, 2022

(30) Foreign Application Priority Data
Apr. 13, 2021   (CN) .......................... 202110393430.4

(51) Int. Cl.
    G06V 40/16       (2022.01)
    G06N 3/04        (2023.01)
    G06F 18/214      (2023.01)

(52) U.S. Cl.
    CPC ........ G06V 40/174 (2022.01); G06F 18/2148 (2023.01); G06N 3/04 (2013.01); G06V 40/169 (2022.01); G06V 40/172 (2022.01)

(58) Field of Classification Search
    CPC .. G06V 40/174; G06V 40/169; G06V 40/172; G06V 10/817; G06V 10/82;
    (Continued)

(56) References Cited

U.S. PATENT DOCUMENTS 11,380,050 B2 * 7/2022 Zhe .................. G06N 3/045

OTHER PUBLICATIONS

Chen et al., "Facial expression recognition based on the ensemble learning of CNNs". (Year: 2020).*

* cited by examiner

Primary Examiner — Phuoc Tran
(74) Attorney, Agent, or Firm — DLA PIPER LLP (US)

(57) ABSTRACT

The present disclosure relates to a method for recognizing facial expressions based on adversarial elimination. First, a facial expression recognition network is built based on a deep convolutional neural network. On a natural facial expression data set, the facial expression recognition network is trained through a loss function to make facial expression features easier to distinguish. Then some key features of input images are actively eliminated by using an improved confrontation elimination method to generate a new data set to train new networks with different weight distributions and feature extraction capabilities, forcing the network to perform expression classification discrimination based on more features, which reduces the influence of interference factors such as occlusion on the network rec- (Continued)

ognition accuracy rate, and improving the robustness of the facial expression recognition network. Finally, the final expression classification predicted results are obtained by using network integration and a relative majority voting method.

6 Claims, 5 Drawing Sheets

(58) Field of Classification Search
CPC ............... G06V 10/809; G06V 40/168; G06F 18/2148; G06N 3/04; G06N 3/0464; G06N 3/045; G06N 3/082; G06N 3/096
See application file for complete search history.

METHOD FOR RECOGNIZING FACIAL EXPRESSIONS BASED ON ADVERSARIAL ELIMINATION

CROSS REFERENCE TO RELATED APPLICATION(S)

This application claims priority to Chinese Patent Application No. 202110393430.4, filed Apr. 13, 2021, which is herein incorporated by reference in its entirety.

TECHNICAL FIELD

The present disclosure relates to the field of computer vision computing, in particular to a method for recognizing facial expressions based on adversarial elimination.

BACKGROUND ART

With the development of deep learning increasing and the application fields of computer vision extending, non-spontaneous facial expression recognition in a laboratory environment is no longer a challenge. The research focus of academic circles has shifted to facial expression recognition under a natural condition. Since the first natural environment facial expression recognition competition EMotiW was held, more and more algorithms for natural facial expression recognition and high-quality natural facial expression data sets have been provided by researchers. In the natural environment, facial expressions will be obviously affected by lighting, occlusion, and changes in postures of tasks. Therefore, extracting effective facial expression features in the natural environment has become one of the main difficulties in the field of facial expression recognition. Although the natural facial expression data set is closer to facial expressions obtained from real scenes, since the natural facial expression data set has small samples, and there are interference factors such as skin color, lighting, and occlusion, network overfitting phenomena are serious. For some images with unobvious key features, classification errors are more likely to occur.

At present, a network for recognizing facial expressions based on an attention mechanism has achieved good results on the natural expression data set. However, the network for recognizing facial expressions based on an attention mechanism needs to be provided with additional input images artificially and requires a large number of attention sub-network for feature extraction of these images. During training, a backbone network and the sub-networks need to run at the same time, which occupies more computer resources.

SUMMARY

In view of the foregoing problems in the prior art, embodiments of the present disclosure provide a method for recognizing facial expressions based on adversarial elimination, which can combine the complementarity of multiple classification networks, improve the accuracy rate of network recognition, and reduce the influence of occlusion factors.

In order to achieve the foregoing objective, the present disclosure adopts the following technical solutions: a method for recognizing facial expressions based on adversarial elimination, including the following steps:

Step 1: preprocessing data
acquiring a natural facial expression data set and dividing images in the data set into a train set and a test set, first performing data normalization on input images, scaling the images to a fixed size, and then performing operations such as data normalization, horizontal flipping, image rotation, and image cropping on images in a train set to obtain a preprocessed data set.

Step 2: building a facial expression recognition network;
step 2.1: among convolutional neural networks models such as VGGNet, ResNet, MobileNet, and DenseNet, selecting a ResNet34 model as a main network structure of the facial expression recognition network preferably, fixing all layers of the ResNet34 model except the last fully connected layer, and changing the number of outputs of the last fully connected layer to the number of categories n of the facial expression data set;

step 2.2: pre-training the facial expression recognition network, importing Imagenet training weights to the modified ResNet34 model, recorded as the facial expression recognition network $h_t$; and setting an initial facial expression recognition network serial number t=0;

step 3: preprocessing the images in the data set according to the method in step 1, inputting the preprocessed images into the facial expression recognition network, training the facial expression recognition network by using a loss function below, and stopping training when the network converges to obtain a category prediction output of a corresponding expression, wherein a loss function computational formula is as follows:

$$L_{Arcface} = -\frac{1}{T}\sum_{k=1}^{T} \log \frac{e^{s(\cos(\theta_{y_i}+m))}}{e^{s(\cos(\theta_{y_i}+m))} + \sum_{j=1, j\neq y_i}^{n} e^{s\cos\theta_j}}, \quad (4)$$

where a batch size and the number of expression categories are T and n respectively, $y_i$ represents a category label of the ith sample image, and $\theta_j$ represents an included angle between the jth column of a weight matrix and the feature, $\theta_{y_i}$ represents an included angle between the $y_i$th column of the weight matrix and the feature, s and m represent a feature scale and an additional angle edge penalty respectively;

step 4: generating multiple facial expression recognition sub-networks with different weight distributions by using an improved adversarial elimination method, where with the improved adversarial elimination method, the training data set of each sub-network can be different, so that the sub-networks can extract different expression features, and thus the generated network has diversity and complementarity, and the specific steps of the improved adversarial elimination method are as follows:

step 4.1: performing class activation mapping on the facial expression recognition network $h_t$ by using a method below, for any input image x in the train set, generating its heat map under a corresponding target category c, setting the kth feature map output by the last convolutional layer as $A^k$, where represents a point (i,j) on the feature map $A^k$, the weight of $A^k$ to a specific expression category c is defined as $W_k^c$, and then the acquisition way of $V_x^c$ is as follows:

$$V_x^c = \text{relu}(\Sigma_k W_k^c \cdot A^k) \quad (2),$$

where a computational formula of the weight $W_k^c$ is:

$$W_k^c = \sum_i \sum_j \alpha_{ij}^{kc} \cdot \text{relu}\left(\frac{\partial Y^c}{\partial A_{ij}^k}\right), \quad (3)$$

in the above formula, relu is an activation function, and $\alpha_{ij}^{kc}$ is a gradient weight of the target category c and $A^k$; and $Y^c$ is a score of the target category c;

step 4.2: setting a threshold G, where G is the maximum value in $V_x^c$; keeping a target region having a value equal to G in $V_x^c$, and setting the values of the remaining regions to 0; upsampling $V_x^c$ to the size of the input image to obtain a target region $R_x$ corresponding to the input image x;

step 4.3: calculating average pixels of all images in the train set, and replacing pixels in the target region $R_x$ corresponding to the image x in the train set with the average pixels, so as to erase the key target region for which the facial expression recognition network makes classification discrimination from the trained image to generate a new train set;

step 4.4: assigning the serial number t of the facial expression recognition network to t+1, generating a new facial expression recognition network $h_t$ according to step 2, sending the newly generated train set and an original test set to $h_t$ according to the method in step 3 for training, and finishing the train when the model converges;

step 4.5: comparing accuracy rates of the sub-network $h_t$ and an initial facial expression recognition network $h_0$ on the test set, when an accuracy rate difference is not larger than 5%, repeating steps 4.1 to step 4.5 to generate a new sub-network; and when the accuracy rate difference is larger than 5%, discarding the subnetwork $h_t$ and setting z=t−1, and finally obtaining z subnetworks: $h_1$, $h_2$, $h_{z-1}$, $h_z$; and step 5: performing network integration on the z+1 facial expression recognition networks $h_0$, $h_1$, $h_2$, ..., $h_{z-1}$, $h_z$, then expressing a predicted output of a network $h_\beta$ on the input image x as an n-dimensional vector $h_\beta(x)=(h_\beta^1(x); h_\beta^2(x); ...; h_\beta^n(x))$, where the network $h_\beta$ represents any network from network $h_0$ to network $h_z$; then performing classification discrimination on output vectors of all networks by using a relative majority voting method to obtain a classification predicted result H(x), that is, the predicted result is a category with the highest score; and if there are multiple categories with the highest score, randomly selecting one category; and the formula of the relative majority voting method is as follows:

$$H(x) = C_{\underset{j}{argmax}\Sigma_{\beta=0}^{z} h_\beta^j(x)}, \quad (4)$$

where $h_\beta^j(x)$ is the output of the network $h_\beta$ on the category $c_j$.

The present disclosure has the following beneficial effects.

The method for recognizing facial expressions based on adversarial elimination used by the present disclosure can realize better classification discrimination of facial expressions under a natural state. By introducing the loss function of the present disclosure, the difference between facial expression features of the same category is reduced, and the difference between facial expression features of different categories is expanded, which makes the facial expression features easier to be distinguished by facial expression recognition networks. Compared with the limitation of feature acquisition of a single convolutional neural network, the improved adversarial elimination method provided by the present disclosure can actively eliminate some key features of the input images to generate new data sets to train new networks with different weight distributions and feature extraction capabilities, forcing the network to perform expression classification discrimination based on more features, which reduces the influence of interference factors such as occlusion on the accuracy rate of network recognition. The method provided by the present disclosure has no need of running multiple networks in parallel at the same time, which greatly reduces the number of computational operations of hardware devices compared with the model for recognizing facial expressions based on an attention mechanism.

DETAILED DESCRIPTION OF THE EMBODIMENTS

In order to enable those skilled in the art to better understand and use the present disclosure, the technical solutions of the present disclosure will be described in detail below with reference to the accompanying drawings and specific implementations. The following embodiments are only used to illustrate the present disclosure and are not used to limit the scope of the present disclosure.

Figure 1:
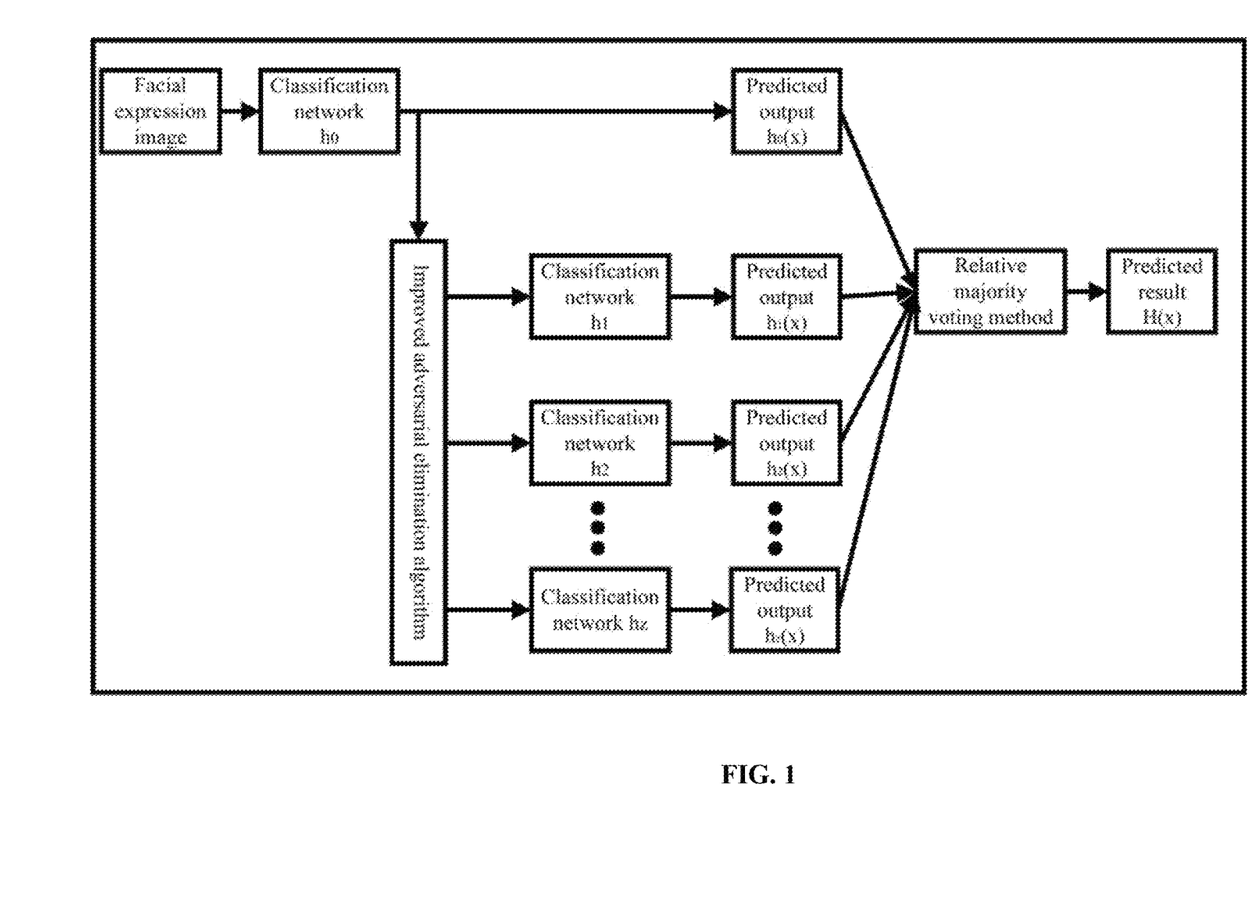
FIG. 1 is a flow chart of a method for recognizing facial expressions based on adversarial elimination of the present disclosure.

The present disclosure relates to a method for recognizing facial expressions based on adversarial elimination. The flow chart thereof is shown in FIG. 1. The method includes the following steps:

Step 1: a natural expression data set RAF-DB is selected as a train set and a test set data, and 12271 train set images and 3068 test set images are used as input images and are preprocessed. Specifically, the input images are scaled to 224×224 first, and are then subjected to data normalization. Operations such as horizontal flipping, image rotation, and image cropping are performed on the train set images for data enhancement. The rotation angle range is within 45 degrees. After performing the foregoing operations on the images, a preprocessed data set is obtained.

Step 2: NVIDIA GeForce RTX3090 GPU is used as a training platform, and Pytorch is used as a deep learning framework. A batch-size of training is set to 32, a learning rate is 0.0001, and an optimization method uses Adam gradient descent method.

Step 3: A ResNet34 model is selected as a main network structure of a facial expression recognition network.

Step 3.1: all layers of the ResNet34 model except the last fully connected layer are fixed, and the number of outputs of the last fully connected layer is changed to the number of facial expression categories 7 of RAF-DB. Basic expression categories include surprise, fear, anger, happiness, sadness, disgust, and neutral. Imagenet training weights are imported into the modified ResNet34 model by using the Pytorch deep learning framework, and the model is recorded as a facial expression recognition network $h_t$. An initial facial expression recognition network serial number is set to be t=0. The structure of the fine-tuned ResNet34 is as shown in Table 1.

TABLE 1

Structure of fine-tuned ResNet34

| Network layer | Type | Convolution kernel size, number | Step size |
|---|---|---|---|
| conv1 | Conv | 7 × 7.64 | 2 |
| conv2_x | Max pool | 3 × 3.64 | 2 |
|  | Conv | $\begin{bmatrix} 3 \times 3.64 \\ 3 \times 3.64 \end{bmatrix} \times 3$ | 1 |
| conv3_x | Conv | $\begin{bmatrix} 3 \times 3.128 \\ 3 \times 3.128 \end{bmatrix} \times 4$ | 1 |
| conv4_x | Conv | $\begin{bmatrix} 3 \times 3.256 \\ 3 \times 3.256 \end{bmatrix} \times 6$ | 1 |
| conv5_x | Conv | $\begin{bmatrix} 3 \times 3.512 \\ 3 \times 3.512 \end{bmatrix} \times 3$ | 1 |
| Global average pool, 7-dims fc | | | |

Step 4: the data set images are preprocessed according to the method in step 1, the preprocessed images are input into the facial expression recognition network, the facial expression recognition network is trained by using a loss function below, and the training is stopped when the network converges to obtain a category prediction output of a corresponding expression. A loss function computational formula is as follows:

$$L_{Arcface} = -\frac{1}{T} \sum_{k=1}^{T} \log \frac{e^{s(\cos(\theta_{y_i}+m))}}{e^{s(\cos(\theta_{y_i}+m))} + \sum_{j=1, j \neq y_i}^{n} e^{s\cos\theta_j}}, \quad (1)$$

where a batch size and the number of expression categories are T and n respectively, $y_i$ represents a category label of the ith sample image, and $\theta_j$ represents an included angle between the jth column of a weight matrix and the feature, $\theta_{yi}$ represents an included angle between the $y_i$th column of the weight matrix and the feature, s and m represent a feature scale and an additional angle edge penalty respectively.

Figure 2:
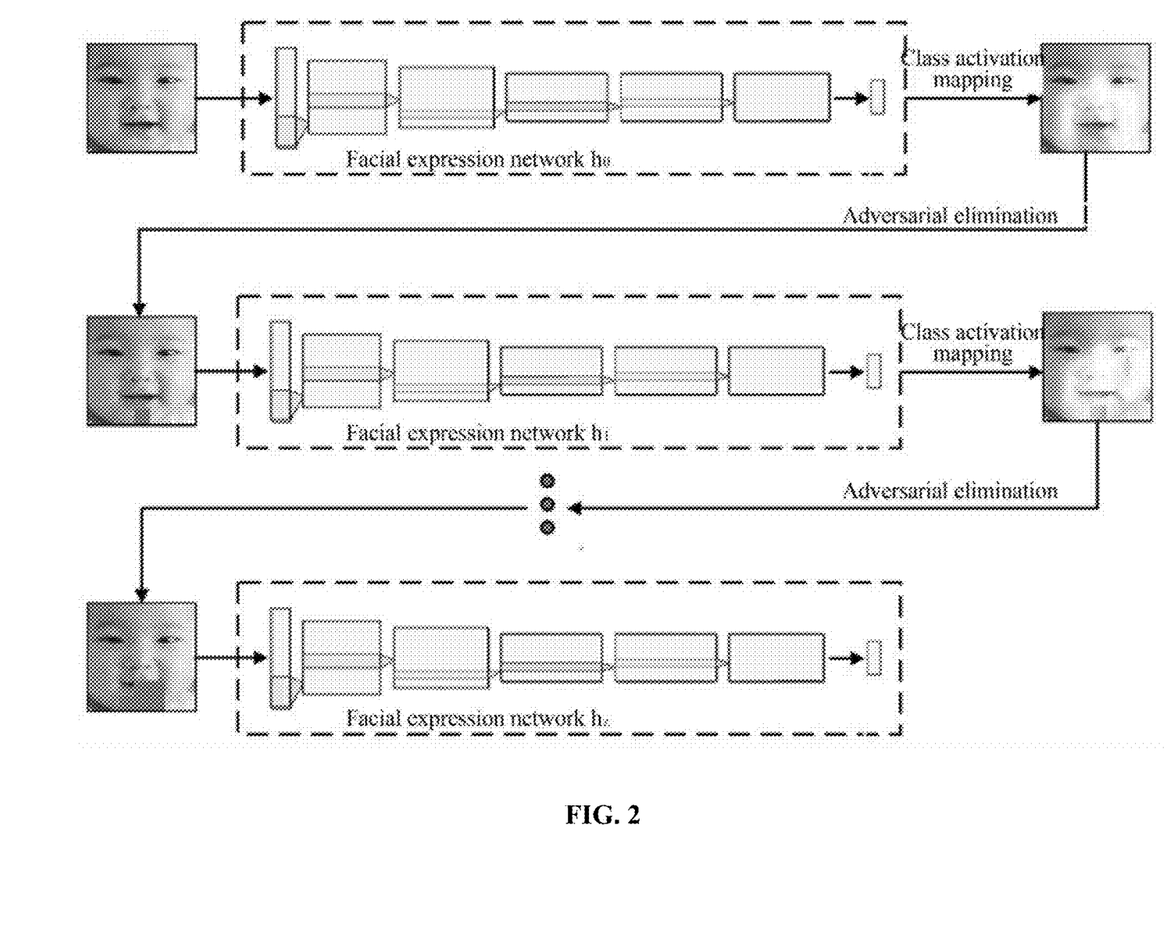
FIG. 2 is a structure diagram of an improved adversarial elimination method of the present disclosure.

Step 5: Multiple facial expression recognition sub-networks with different weight distributions are generated by using an improved adversarial elimination method. With the improved adversarial elimination method, the training data set of each sub-network can be different, so that each sub-network can extract different expression features, and thus the generated network has diversity and complementarity. FIG. 2 is a structure diagram of the improved adversarial elimination method. The specific steps of the improved adversarial elimination method are as follows:

Step 5.1: Class activation mapping is performed on the facial expression recognition network $h_t$ by using the following method. For any input image x in the train set, its heat map $V_x^c$ is generated under a corresponding target category c. The kth feature map output by the last convolutional layer is set as $A^k$. $A_{ij}^k$ represents a point (i,j) on the feature map $A^k$. The weight of the kth feature map to a specific expression category c is defined as $W_k^c$, then the acquisition way is as follows:

$$V_x^c = \text{relu}(\Sigma_k W_k^c \cdot A^k) \quad (2),$$

where a computational formula of the weight is:

$$W_k^c = \sum_i \sum_j \alpha_{ij}^{kc} \cdot \text{relu}\left(\frac{\partial Y^c}{\partial A_{ij}^k}\right). \quad (3)$$

In the above formula, relu is an activation function, and $\alpha_{ij}^{kc}$ is gradient weights of the target category c and $A^k$; and $Y^c$ is a score of the target category c.

Figure 3A:
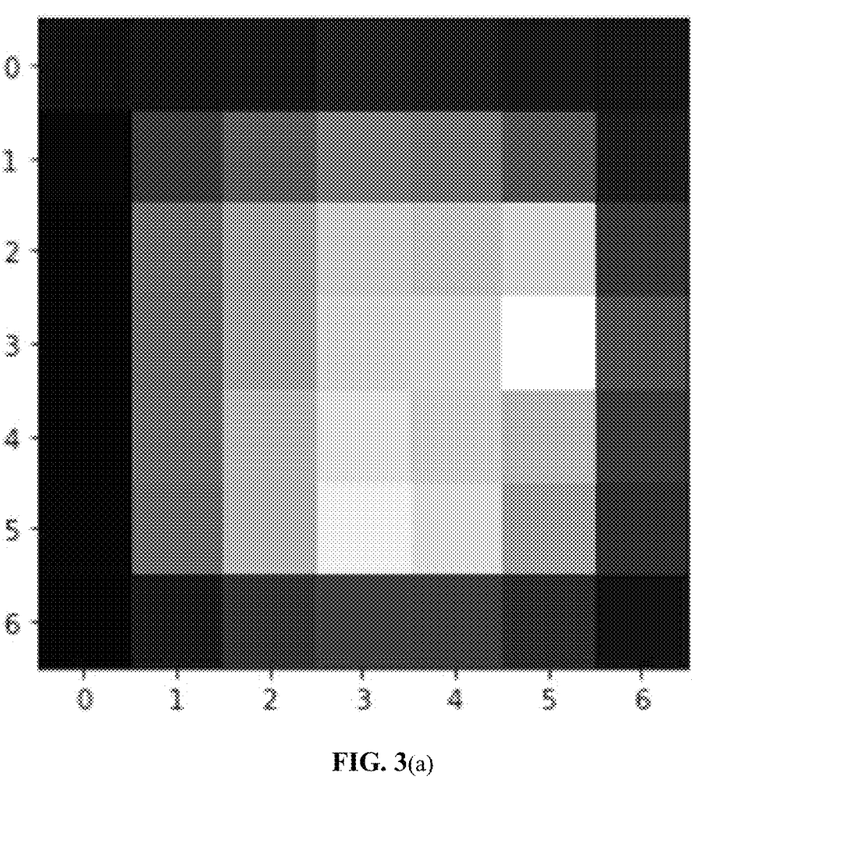
FIGS. 3A and 3B are schematic diagrams of obtaining a target region through a heat map of the present disclosure.
Figure 3B:
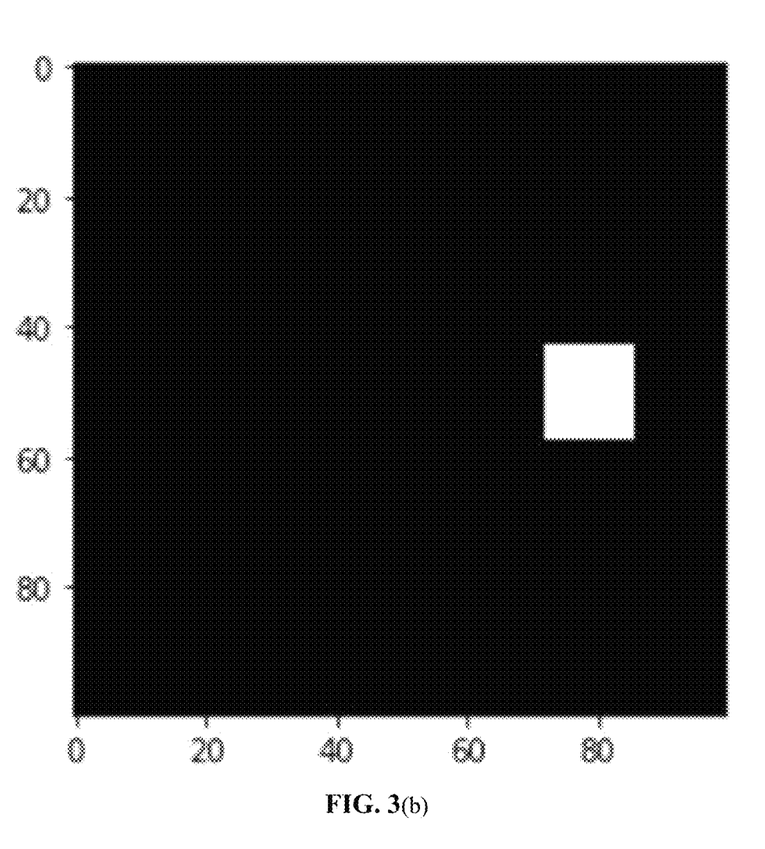

Step 5.2: FIGS. 3A and 3B are schematic diagrams of obtaining a target region through a heat map. In particular, FIG. 3(a) is a heat map $V_x^c$ of an input image x in a corresponding target category c, with a size of 7×7. A threshold G is set, which is the maximum value in $V_x^c$. FIG. 3(b) is a target region $R_x$ corresponding to the input image x. First, the target region having a value equal to G in $V_x^c$ is kept, and the values of the remaining regions is to 0. $V_x^c$ is upsampled to the size of an original input image by nearest neighbor interpolation to obtain a target region $R_x$ with a size of 100×100.

Step 5.3: Average pixels of all images in the train set are calculated on three channels R, G, and B respectively. Pixels of a corresponding channel in the target region $R_x$ corresponding to the image x in the train set are replaced with the average pixels of the three channels R, G, and B, so as to erase a key target region for which the facial expression recognition network makes classification discrimination from the trained image to generate a new train set.

Step 5.4: The serial number t of the facial expression recognition network is assigned t+1, a new facial expression recognition network $h_t$ is generated according to step 3, the newly generated train set and an original test set are sent to $h_t$ according to the method in step 4 for training, and the train is finished when the model converges.

Step 5.5: Accuracy rates of the sub-network $h_t$ and an initial facial expression recognition network $h_0$ on the test set are compared, when an accuracy rate difference is not larger than 5%, steps 5.1 to step 5.5 are repeated to generate a new sub-network; and when the accuracy rate difference is larger than 5%, the subnetwork $h_t$ is discarded, and finally 10 facial expression recognition subnetworks are obtained.

Figure 4:
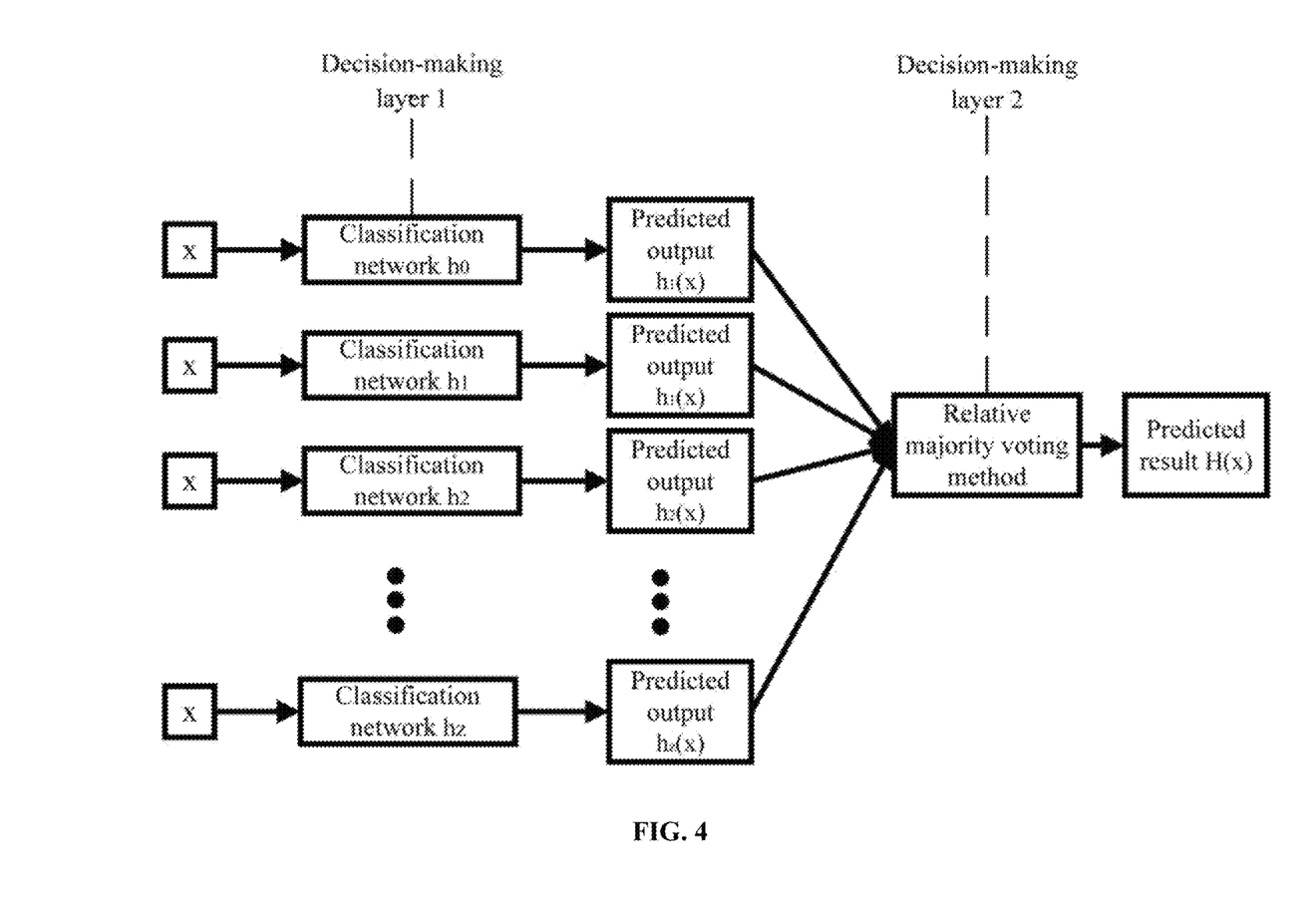
FIG. 4 is a structure diagram of network integration of the present disclosure.

Step 6: A network integration part of the present disclosure is as shown in FIG. 4, and this part includes two decision-making layers. The first decision-making layer performs network integration on 11 facial expression recognition networks $h_0, h_1, h_2, \ldots, h_9, h_{10}$, then expresses a predicted output of a network $h_\beta$ on the input image x as an n-dimensional vector $h_\beta(x)=(h_\beta^1(x); h_\beta^2(x); \ldots ; h_\beta^n(x))$, where the network $h_\beta$ represents any network from network $h_0$ to network $h_z$. The second decision-making layer performs classification discrimination on output vectors of all networks by using a relative majority voting method to obtain a classification predicted result H(x), that is, the predicted result is a category with the highest score; and if there are multiple categories with the highest score, one category is randomly selected. The formula of the relative majority voting method is as follows:

$$H(x) = C_{\underset{j}{\text{argmax}} \Sigma_{\beta=0}^{10} h_\beta^j(x)}, \quad (4)$$

where $h_i^j(x)$ is an output of a network $h_i$ on a category $c_j$.

The description above is only used to illustrate the present disclosure, not to limit the technical solutions described in the present disclosure. Any modifications, equivalent replacements and improvements made within the spirit and principle of the present disclosure shall be encompassed in the protection scope of the present disclosure.

What is claimed is:

1. A method for recognizing facial expressions based on adversarial elimination, comprising the following steps:

step 1, preprocessing data, acquiring a natural facial expression data set and using images in the data set as input images, and preprocessing the input images to obtain a preprocessed data set;

building a facial expression recognition network;

preprocessing the images in the data set according to the method in step 1, inputting the preprocessed images into the facial expression recognition network, training the network by using a loss function, and stopping training when the network converges to obtain a category prediction output of a corresponding expression;

generating multiple facial expression recognition sub-networks with different weight distributions by using an improved adversarial elimination method, wherein with the improved adversarial elimination method, the training data set of each sub-network can be different, so that the sub-networks can extract different expression features, and thus the generated network has diversity and complementarity; and performing network integration on the multiple sub-networks, and making final classification discrimination based on multiple expression prediction classifications obtained from the multiple sub-networks.

2. The method for recognizing facial expressions based on adversarial elimination according to claim 1, wherein the preprocessing specifically refers to first performing data normalization on the input images, scaling the images to a fixed size, and then performing operations such as data normalization, horizontal flipping, image rotation, and image cropping on images in a train set to obtain a preprocessed data set.

3. The method for recognizing facial expressions based on adversarial elimination according to claim 1, wherein the building a facial expression recognition network comprises the following steps:

selecting a ResNet34 model as a main network structure of the facial expression recognition network; fixing all layers of the ResNet34 model except the last fully connected layer, and changing the number of outputs of the last fully connected layer to the number of categories n of the facial expression data set; and pre-training the facial expression recognition network, importing Imagenet training weights to the modified ResNet34 model, recorded as the facial expression recognition network $h_t$; and setting an initial facial expression recognition network serial number t=0.

4. The method for recognizing facial expressions based on adversarial elimination according to claim 1, wherein a computational formula of the loss function is as follows:

$$L_{Arcface} = -\frac{1}{T}\sum_{k=1}^{T} \log \frac{e^{s(\cos(\theta_{y_i}+m))}}{e^{s(\cos(\theta_{y_i}+m))} + \sum_{j=1, j\neq y_i}^{n} e^{s\cos\theta_j}},$$

where a batch size and the number of expression categories are T and n respectively, $y_i$ represents a category label of the ith sample image, and $\theta_j$ represents an included angle between the jth column of a weight matrix and the feature, $\theta_{y_i}$ represents an included angle between the $y_i$th column of the weight matrix and the feature, s and m represent a feature scale and an additional angle edge penalty respectively.

5. The method for recognizing facial expressions based on adversarial elimination according to claim 1, wherein the improved adversarial elimination algorithm comprises the following steps:

performing class activation mapping on the facial expression recognition network $h_t$ by using the following method, for any input image x in the train set, generating its heat map $V_x^c$ under a corresponding target category c, setting the kth feature map output by the last convolutional layer as $A^k$, where $A_{ij}^k$ represents a point (i,j) on the feature map $A^k$, the weight of $A^k$ to a specific expression category c is defined as $W_k^c$, then the acquisition way of $V_x^c$ is as follows:

$$V_x^c = \text{relu}(\Sigma_k W_k^c \cdot A^k),$$

where a computational formula of the weight $W_k^c$ is:

$$W_k^c = \sum_i \sum_j \alpha_{ij}^{kc} \cdot relu\left(\frac{\partial Y^c}{\partial A_{ij}^k}\right),$$

in the above formula, relu is an activation function, and $\alpha_{ij}^{kc}$ is gradient weights of the target category c and $A^k$; and $Y^c$ is a score of the target category c;

setting a threshold G, where G is the maximum value in $V_x^c$; keeping a target region having a value equal to G in $V_x^c$, and setting the values of the remaining regions to 0; upsampling $V_x^c$ to the size of the input image to obtain a key target region $R_x$ corresponding to the input image x;

calculating average pixels of all images in the train set, and replacing pixels in the key target region $R_x$ corresponding to the image x in the train set with the average pixels, so as to erase the key target region for which the facial expression recognition network makes classification discrimination from the trained image to generate a new train set;

assigning the serial number t of the facial expression recognition network to t+1, generating a new facial expression recognition network $h_t$ according to step 2, sending the newly generated train set and an original test set to $h_t$ according to the method in step 3 for training, and finishing the train when the model converges; and comparing accuracy rates of the sub-network $h_t$ and an initial facial expression recognition network $h_0$ on the test set, when an accuracy rate difference is not larger than 5%, repeating steps 5.1 to step 5.5 to generate a new sub-network; and when the accuracy rate difference is larger than 5%, discarding the subnetwork $h_t$, and setting z=t−1, and finally obtaining z generated subnetworks:

$h_1, h_2, \ldots, h_{z-1}, h_z$.

6. The method for recognizing facial expressions based on adversarial elimination according to claim 1, wherein a method for network integration is:

performing network integration on z+1 facial expression recognition networks $h_0, h_1, h_2, \ldots, h_{z-1}, h_z$, then expressing a predicted output of a network $h_\beta$ on the input image x as an n-dimensional vector $h_\beta(x)=(h_\beta^1(x); h_\beta^2(x); \ldots; h_\beta^n(x))$, where the network $h_\beta$ represents any network from network $h_0$ to network $h_z$;

then performing classification discrimination on output vectors of all networks by using a relative majority voting method to obtain a classification predicted result H(x), that is, the predicted result is a category with the highest score; and if there are multiple categories with the highest score, randomly selecting one category; and the formula of the relative majority voting method is as follows:

$$H(x) = C_{\underset{j}{argmax} \sum_{\beta=0}^{c} h_\beta^j(x)},$$

where $h_\beta^j(x)$ is an output of the network $h_\beta$ on a category $c_j$.

* * * * *